US006649677B2

(12) United States Patent
Jaatinen et al.

(10) Patent No.: US 6,649,677 B2
(45) Date of Patent: *Nov. 18, 2003

(54) POLYCARBONATE SHEET WITH IMPROVED FIRE RETARDANT PERFORMANCE

(75) Inventors: Marja A. Jaatinen, Bergen Op Zoom (NL); Johanes M. Goossens, Bergen Op Zoom (NL)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 31 days.

(21) Appl. No.: 09/184,993

(22) Filed: Nov. 3, 1998

(65) Prior Publication Data

US 2003/0134948 A1 Jul. 17, 2003

(51) Int. Cl.$^7$ .................. C08K 5/524; C08K 5/103
(52) U.S. Cl. ............... 524/227; 524/128; 524/311; 524/147; 264/300
(58) Field of Search ............... 524/227; 264/300

(56) References Cited

U.S. PATENT DOCUMENTS

| | | | |
|---|---|---|---|
| 3,274,144 A | * 9/1966 | Keskkula et al. ............ 524/226 |
| 4,104,433 A | 8/1978 | Kirk et al. |
| 4,163,834 A | 8/1979 | Wear |
| 4,172,858 A | 10/1979 | Clubley et al. |
| 4,248,976 A | 2/1981 | Clubley et al. |
| 4,399,251 A | * 8/1983 | Lee ............... 524/560 |
| 4,409,351 A | * 10/1983 | Lee ............... 524/611 |
| 4,415,696 A | * 11/1983 | Mark ............. 524/611 |
| 4,446,268 A | * 5/1984 | Lee ............... 524/610 |
| 4,554,302 A | * 11/1985 | Miller ............ 524/233 |
| 4,626,566 A | * 12/1986 | Miller et al. ...... 524/490 |
| 4,670,479 A | 6/1987 | Miyauchi et al. |
| 4,762,873 A | 8/1988 | Miyauchi et al. |
| 4,990,549 A | 2/1991 | Delvin et al. |
| 5,122,551 A | 6/1992 | Gallucci et al. |
| 5,175,198 A | 12/1992 | Minnick et al. |
| 5,316,834 A | 5/1994 | Matsuda et al. |
| 5,326,793 A | 7/1994 | Gallucci et al. |
| 5,364,926 A | 11/1994 | Sakashita et al. |
| 5,371,123 A | 12/1994 | Gallucci et al. |
| 5,418,269 A | * 5/1995 | Ishiwa et al. ...... 524/424 |
| 5,484,874 A | * 1/1996 | Ishiwa et al. ...... 528/196 |
| 5,510,448 A | 4/1996 | Fontaine et al. |
| 5,606,007 A | * 2/1997 | Sakashita et al. ...... 528/176 |
| 5,612,163 A | 3/1997 | Teramoto et al. |
| 5,656,684 A | 8/1997 | Kohler et al. |
| 5,786,411 A | * 7/1998 | Barren et al. ...... 524/102 |
| 5,807,914 A | * 9/1998 | Obayashi et al. ...... 524/267 |
| 5,852,158 A | * 12/1998 | De Bont et al. |

FOREIGN PATENT DOCUMENTS

| | | |
|---|---|---|
| EP | 0 335 239 A | 10/1989 |
| EP | 0 628 957 A | 12/1994 |
| EP | 0 899 294 A | 3/1999 |
| JP | 08 127661 A | 5/1996 |
| JP | 08-127661 | 5/1996 |

OTHER PUBLICATIONS

French Norm NF P 92–505 "French Dripping Test".

* cited by examiner

*Primary Examiner*—Peter Szekely

(57) ABSTRACT

It has been discovered that the fire resistance properties of polycarbonate sheet can be greatly enhanced by significantly reducing the viscosity of the resin used to manufacture the sheet. Moreover, the fire resistance of the sheet can be further enhanced by carefully controlling the content of phosphorous-based stabilizer, in combination with the processing release agent, within a specific range.

40 Claims, 1 Drawing Sheet

POLYCARBONATE SHEET WITH IMPROVED FIRE RETARDANT PERFORMANCE

BACKGROUND

This application relates generally to polycarbonate sheet having improved fire resistance. Specifically, this application relates to polycarbonate sheet having fire resistance sufficient to pass certain government mandated tests for building materials.

Polycarbonate sheet is an advantageous material to use for various building applications because it can be made transparent, and it has impact resistance far superior to glass or transparent acrylic plastics. However, polycarbonate can be problematic from a fire resistance standpoint.

Various efforts have been made to improve the fire resistance of polycarbonate sheet. Specifically, many inventors have focused on producing polycarbonate sheet having improved fire resistance by adding various fire retarding chemicals to polycarbonate. Fire resistance enhancing additives for polycarbonate are described, for example, in U.S. Pat. No. 4,248,976. Others have focused on developing flame retardant coatings for polycarbonate, as described, for example, in U.S. Pat. No. 4,163,834. It is also known to improve the fire resistance of polycarbonate by incorporating a brominated polycarbonate copolymer as described, for example, in U.S. Pat. No. 5,612,163. Certain flame-retardant copolymers of polycarbonate have also been developed, as described in U.S. Pat. No. 5,175,198.

Unfortunately, each of these methods has presented certain drawbacks. Fire retarding chemical additives introduce added expense and often negatively influence the color stability, transparency and long term aging properties of polycarbonate sheet. Adding a brominated copolymer can also be problematic for the aforementioned reasons, and additionally, raises environmental issues. Adding flame retardant coatings to the sheet introduces additional expense and complexity to the manufacturing process. Finally, producing a copolymer will often greatly alter the physical properties of the finished sheet.

Commercial grades of polycarbonate sheet are typically manufactured from a heat stabilizer, a processing release agent, and a high viscosity branched polycarbonate resin and/or a high viscosity linear polycarbonate resin. Typical commercial grades of polycarbonate sheet are made from linear polycarbonate resin having a viscosity of 4.5 to 8.0 $cm^3/10$ min (300 deg. ° C., 1.2 kg) (e.g, LEXAN® ML3403 and MAKROLON® 31XX), or branched polycarbonate resin having a viscosity of 4 to 6.5 $cm^3/10$ min (300 deg. ° C., 2.16 kg) (e.g., LEXAN® ML3324 and MAKROLON® 1143). There are also some new branched sheet grades on the market (e.g., MAKROLON ku1-1243) that have and MVR of 8–11 $cm^3/10$ min (300 deg. ° C., 2.16 kg).

There are many different government-mandated tests for evaluating the fire resistance of polycarbonate sheet building materials. One of the more aggressive tests is French norm NF P 92-505 (hereinafter "the French dripping test"), which is incorporated by reference herein. In this test, a radiator is placed above a specimen of the test material supported on a grid. Cotton wool is placed in a receptacle below the test material. During the test, the radiator is turned on for 10 minutes, and droplets from the specimen may fall through the grid onto the cotton wool. If the cotton wool burns, the specimen is considered as failing the test. This test is described more fully below, and an apparatus for performing the test is shown in FIG. 1.

SUMMARY OF THE INVENTION

It has been discovered that the fire resistance properties of polycarbonate sheet may be greatly enhanced without resorting to any of the undesirable methods described above. Specifically, the fire resistance of polycarbonate sheet can be greatly enhanced by significantly reducing the viscosity of the polycarbonate resin in the sheet. Moreover, the fire resistance of the sheet can be further enhanced by carefully controlling the content of phosphorous-based stabilizer and processing release agent within specific ranges.

The fire resistant polycarbonate sheet according to the invention may comprise branched polycarbonate resin having an MVR above 11 $cm^3/10$ minutes when measured at 300° C. and 2.16 kg. Alternatively, the fire resistant polycarbonate sheet according to the invention may comprise linear polycarbonate resin having an MVR above 8 $cm^3/10$ minutes when measured at 300° C. and 1.2 kg. The fire resistant polycarbonate sheet according to the invention typically further comprises a phosphorous-based stabilizer and a processing release agent.

According to a preferred embodiment of the invention, the fire resistant sheet may be made from branched polycarbonate resin having an MVR above 13 $cm^3/10$ minutes when measured at 300° C. and 2.16 kg. In this embodiment, the sheet preferably further comprises from 0.003 to 0.007 total weight percent (i.e., based on the total weight of all the ingredients) of the phosphorous stabilizer, based on the weight of phosphorous in the phosphorous stabilizer. To clarify, this number is calculated by determining the weight attributed to the phosphorous atoms in the phosphorous stabilizer, and dividing by the total weight of all the ingredients.

According to a different preferred embodiment of the invention, the fire resistant sheet may be made from linear polycarbonate resin having an MVR above 10 $cm^3/10$ minutes when measured at 300° C. and 1.2 kg. In this embodiment, the sheet preferably further comprises from 0.002 to 0.01 total weight percent (i.e., based on the total weight of all the ingredients) of the phosphorous stabilizer, based on the weight of phosphorous in the phosphorous stabilizer.

Other features, aspects and advantages of the invention will become better understood with reference to the following detailed description of some preferred embodiments of the invention, the drawings and the appended claims.

DETAILED DESCRIPTION OF THE PREFERRED EMBODIMENT

Figure 1:
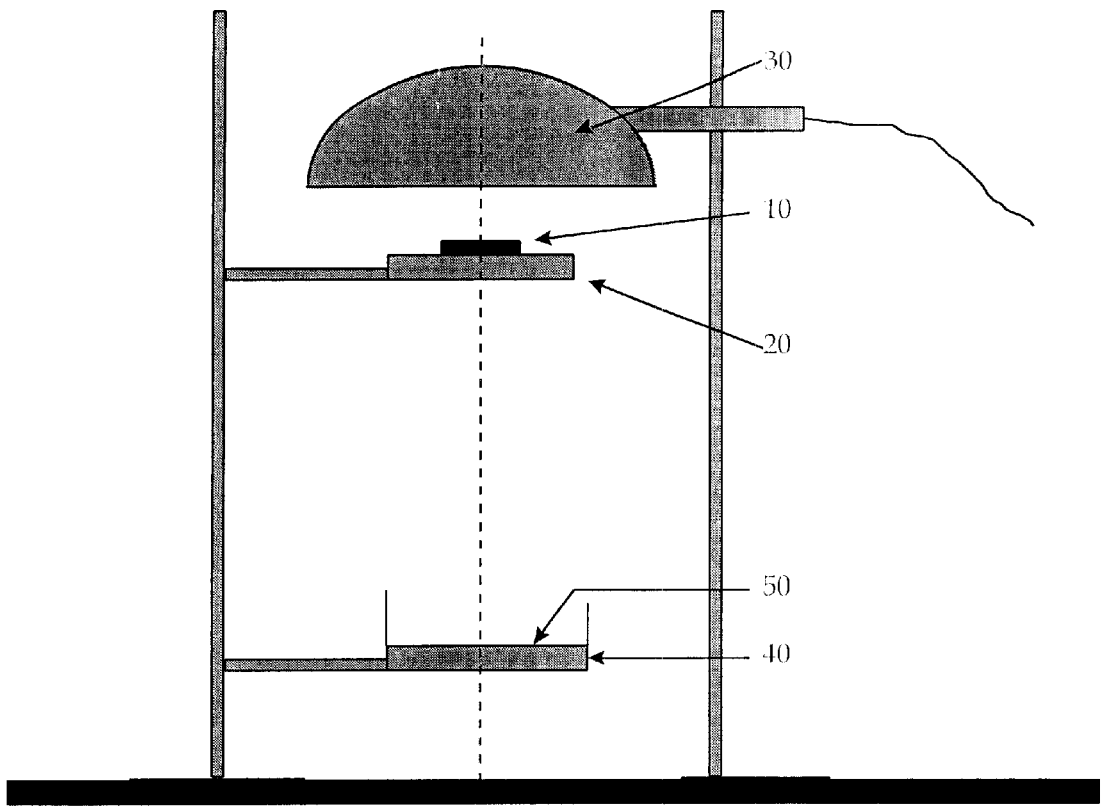
FIG. 1 depicts a diagrammatic side elevational view of an apparatus used to perform a test for fire retardant performance under French flammability test NF P 92-505.

As stated above, the fire resistant polycarbonate sheet according to the invention is preferably prepared by combining together a low-viscosity polycarbonate resin, a phosphorous based stabilizer and a processing release agent. This combination of ingredients is then formed into a sheet, typically by melt extrusion. Other optional additional ingredients may also be added. The polycarbonate resin may be branched or linear, or a combination of both. The polycarbonate resin may be made by any technique, including the well-known melt and interfacial techniques.

Aromatic polycarbonates are generally the most useful type of polycarbonates for preparing the sheet compositions described herein. Typically, aromatic polycarbonates are prepared by reacting a dihydric phenol with a carbonate precursor, such as phosgene, a haloformate or a carbonate ester. The reaction is generally conducted in the presence of an acid acceptor and a molecular weight regulator. Such carbonate polymers may be typified as possessing recurring structural units of the formula:

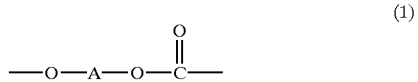

(1)

wherein A is a divalent aromatic radical of the dihydric phenol employed in the polymer reaction. The dihydric phenols, which may be employed to provide such aromatic carbonate polymers, are mononuclear or polynuclear aromatic compounds, containing as functional groups two hydroxy radicals, each of which maybe attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl)methane; bis(2-hydroxyphenyl) methane; bis(4-hydroxyphenyl)methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl) pentane; 2,2'-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dibromo-4-hydroxyphenyl)propane; 2,2-bis(3,5-dimethy-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, spirobiidane bisphenol and the like.

These aromatic polycarbonates can be manufactured by known processes. Two different conventional processes are commonly known as the melt and interfacial processes. In the interfacial process, a dihydric compound is reacted with a carbonate precursor such as a carbonyl halide or a haloformate. The melt polymerization process involves the transesterification of an aromatic dihydroxy compound and a diester carbonate. The melt polymerization process is more fully described in U.S. Pat. No. 5,364,926, which is hereby incorporated by reference. In the practice of this invention, the process of producing the polycarbonate polymer is not critical.

The carbonate precursor employed in preparing the polycarbonate of this invention via the interfacial process can be either carbonyl halide or a haloformate. The carbonyl halides which can be employed herein are, for example, carbonyl bromide, carbonyl chloride, or mixtures thereof. The haloformates suitable for use herein include bishaloformates of dihydric phenols (e.g., bischloroformates of bisphenol A or hydroquinone) or glycols (e.g., bishaloformates of ethylene glycol, neopentyl glycol or polyethylene glycol). While many other carbonate precursors will occur to those skilled in the art, carbonyl chloride, also known as phosgene, is preferred.

It is also possible to employ two or more different dihydric phenols or a copolymer of a dihydric phenol with a glycol, a hydroxy- or acid-terminated polyester, a dibasic acid or hydroxy acid, in the event a carbonate copolymer or interpolymer rather than a homopolymer is desired for use in the preparation of the polycarbonate mixtures of the invention. Polyarylates and polyester-carbonate resins or their blends can also be employed. Branched polycarbonates are also useful and are well disclosed in the literature. Also, blends of linear polycarbonate and a branched polycarbonate can be utilized herein. Moreover, blends of any of the above materials may be employed in the practice of this invention.

The preferred aromatic polycarbonate for use in the practice in the present invention is a homopolymer, derived from 2,2-bis(4-hydroxyphenyl) propane ("bisphenol-A") and phosgene, commercially available under the trademark designation LEXAN®, which is a registered trademark of General Electric Company.

The polycarbonates are preferably low molecular weight aromatic polycarbonates having an intrinsic viscosity, as determined in chloroform at 25° C., of from about 0.3 to about 1.5 deciliters per gram (dl/gm). The intrinsic viscosity is most preferably from about 0.45 to about 1.0 dl/gm. These polycarbonates may be branched or unbranched, and generally will have a weight average molecular weight of from about 10,000 to about 200,000, or more preferably from about 20,000 to about 100,000, as measured by gel permeation chromatography.

The branched polycarbonates may be prepared by adding a branching agent during polymerization. These branching agents are well known and may comprise polyfunctional organic compounds containing at least three functional groups which may by hydroxyl, carboxyl, carboxylic anhydride, haloformyl and mixtures thereof. Specific examples include trimellitic acid, trimellitic anhydride, trimellitic trichloride, tris-p-hydroxy phenyl ethane, trisphenol TC (1,3,5-tris((p-hydroxyphenyl) isopropyl) benzene), tris-phenol PA (4(4(1,1-bis(p-hydroxyphenyl)-ethyl)alpha, alpha-dimethyl benzyl)phenol), 4-chloroformyl phthalic anhydride, trimesic acid and benzophenone tetracarboxylic acid. The branching agent may be added at a level of about 0.05–2.0 weight percent.

All types of polycarbonate end groups are contemplated as being within the scope of the present invention.

The polycarbonate resins useful for preparing fire resistant polycarbonate sheet according to the present invention have low viscosity, which corresponds to a high MVR. Specifically, when branched polycarbonate resin is employed, the melt volume ratio (hereinafter "MVR") should be above 11 cm$^3$/10 minutes measured at 300° C. and 2.16 kg. The MVR value for a sample may be measured using known procedures such as described in standard tests according to DIN 53735/ISO 1133, which is hereby incorporated by reference. It is more preferred for the MVR to be above 13 cm$^3$/10 minutes (300° C., 2.16 kg) for branched polycarbonate resin. It is even more preferred for the MVR to be between 13 and 20 cm$^3$/10 minutes 300° C., 2.16 kg), and most preferred for the MVR to be between 13 and 18 cm$^3$/10 minutes (300° C., 2.16 kg). When linear polycarbonate resin is employed, the MVR should be above 8 cm$^3$/10 minutes measured at 300° C. and 1.2 kg. It is more preferred for the MVR to be above 10 cm$^3$/10 minutes (300° C., 1.2 kg) for branched polycarbonate resin. It is even more preferred for the MVR to be between 10 and 20 cm$^3$/10 minutes (300° C., 1.2 kg), and most preferred for the MVR to be between 10 and 13 cm$^3$/10 minutes (300° C., 1.2 kg). These are general, preferred ranges. The optimal MVR range also depends on the processing equipment used, sheet thickness and sheet dimensions. The skilled artisan can easily perform tests to explore how these factors affect the optimum range.

The sheet made according to the present invention may be of any type or thickness. For example, the sheet may contain a single layer or be laminated with several layers. The sheet may also be a "multiwall" sheet containing a plurality of parallel sheets joined together by internal members connecting adjacent walls. Such "multiwall" sheets have some empty space between the inner and outer walls. Also, the sheet may be curved, corrugated, bent, formed in a "wave" or "saw-tooth" pattern or formed into other specific shapes. In a preferred embodiment of the invention, the sheet may be a solid sheet having a thickness of 1 to 12 mm, or more preferably, 1 to 6 mm. In another preferred embodiment of the invention, the sheet may be layered and have a thickness of 1 to 40 mm, or more preferably, 1 to 20 mm. It is also possible to include layers of other materials, such as glass cloth, between polycarbonate layers in layered sheet. All such composites are also contemplated by this application.

The MVR of branched and linear resin may be adjusted during the manufacturing process by controlling several factors which affect molecular weight of the polymer. For instance, the processing temperature, residence time, the stabilizers added during compounding, and the degree of end capping all affect the MVR of the resin produced and can be varied in known ways to achieve low viscosity resins useful for the invention.

The fire resistant polycarbonate sheet according to the invention preferably also comprises a phosphorous stabilizer. Typical phosphorous stabilizers include phosphites, (e.g., aromatic phosphite thermal stabilizers), metal salts of phosphoric and phosphorous acid. Hindered phenol antioxidants, aromatic lactone radical scavengers, and amines (e.g., hexa methyl tetra amine), may also be added as stabilizers or antioxidants. Preferred phosphorous stabilizers include tris(2,4-di-t-butylphenyl)-phosphite; 2,4,6-tri-t-butylphenyl 2-butyl-2-ethyl-1,3-propane diol phosphite; bis (2,4-dicumylphenyl)pentaerytritol diphosphite; diphenyl isodecyl phosphite; and bis(2,4-ditertiarybutylphenyl) pentaerythritol diphosphite. When the fire resistant sheet comprises branched polycarbonate resin, the preferred amount of phosphorous stabilizer (taking into account only the weight fraction due to phosphorous atoms in the stabilizer) is from 0.003 to 0.007 weight percent of the total composition. When the fire resistant sheet comprises linear polycarbonate resin, the preferred amount of phosphorous stabilizer (taking into account only the weight fraction due to phosphorous atoms in the stabilizer) is from 0.002 to 0.01 weight percent of the total composition.

The fire resistant polycarbonate sheet according to the invention preferably further comprises a processing release agent. Suitable processing release agents include pentaerythritol tetracarboxylate, glycerol monocarboxylate, glycerol triscarboxylate, polyolefins, alkyl waxes and amides. Preferred processing release agents include pentaerythritol tetrastearate and pentaerythritol esters. The preferred amount of processing release agent is 0.05 to 0.2 weight percent of the total composition.

Other resins and additives such as pigments, dyes, reinforcing agents, fillers, impact modifiers, heat resisting agents, antioxidants, anti-weathering agents, antistatic agents, ultraviolet radiation (hereinafter "UV") blockers, lubricants, nucleating agents, plasticizers, flame retardants (to further enhance fire resistance if necessary), flow-improving agents and anti-statics may also be added to the sheet. These additives may be introduced in a mixing or molding process, provided the properties of the composition are not damaged.

Any type of pigment that is well known for inclusion in thermoplastic materials can be added to the sheet. Preferred pigments include titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide.

It may also be advantageous to include various chemicals to prevent degradation of the sheet due to exposure to UV light (hereinafter "UV stabilizers"). Suitable UV stabilizers include substituted benzotriazoles, or triazines, or tetraalkylpiperidines. The UV stabilizers may be mixed into the sheet, or they can be included in a "hardcoat" transparent protective layer, which is applied over the viewing surface.

Suitable reinforcing fillers include metallic fillers such as fine powder aluminum, iron, nickel, or metal oxides. Non-metallic fillers include carbon filaments, silicates such as mica, aluminum silicate or clay, talc and asbestos, titanium oxide, wollastonite, novaculite, potassium titanate, titanate whiskers, glass fillers and polymer fibers or combinations thereof. Glass fillers useful for reinforcement are not particularly limited in their types or shapes and may be, for instance, glass fibers, milled glass, glass flakes and hollow or solid glass beads. Glass fillers may be subjected to surface treatment with coupling agents such as silane or titanate-type agents to enhance adhesion with resin. Reinforcing fillers are preferably used in an amount sufficient to yield the reinforcing effect, usually 1 to 60% by weight, preferably 5 to 50% by weight, based on the total weight of the composition.

Suitable antistatic agents include, but are not limited to, phosphonium salts, polyalkylene glycols, sulfonium salts and alkyl and aryl ammonium salts.

To prepare the resin composition of the invention, the components may be mixed by any known methods. Typically, there are two distinct mixing steps: a premixing step and a melt mixing step. In the premixing step, the dry ingredients are mixed together. This premixing step is typically performed using a tumbler mixer or a ribbon blender. However, if desired, the premix may be manufactured using a high shear mixer such as a Henschel mixer or similar high intensity device. The premixing step must be followed by a melt mixing step where the premix is melted and mixed again as a melt.

Alternatively, it is possible to skip the premixing step, and simply add the raw materials directly into the feed section of a melt mixing device (such as an extruder) via separate feed systems. In the melt mixing step, the ingredients are typically melt kneaded in a single screw or twin screw extruder, and extruded as pellets. The pellets are then typically fed into a second extruder where they are melted again and extruded as sheet.

French flammability test NF P 92-505 (hereinafter "the French dripping test"), which is hereby incorporated by reference, was selected to evaluate the samples prepared according to the present invention. Referring to FIG. 1, In this test, a sample 10 is placed on a support grid 20 located thirty (30) mm under a radiator 30. A drop receptacle 40 containing cotton wool 50 is placed three-hundred (300) mm below the support grid 20. The sample must be 7 cm×7 cm, and have a minimum weight of 2 g. The radiator is a horizontal 500 W electric radiator which irradiates the sample with a radiation intensity of 3 W/cm$^2$. The test lasts for a total of ten minutes. If the specimen ignites within the first five minutes after turning on the radiator 30, the radiator 30 is removed three seconds after ignition and radiation is continued as soon as the specimen extinguishes. During the second five minutes, radiation is maintained regardless of whether the sample burns. During the test, the radiator 30 is operated for ten minutes. A sample fails this test (i.e., receives an "M4" rating) if the cotton wool 50 starts to burn.

The French dripping test is considered one of the more aggressive European flammability tests for building materials such as polycarbonate sheet. However, as shown below, samples prepared according to the present invention are capable of consistently passing this test and do not have the drawbacks of conventional fire resistant polycarbonate-sheet as listed in the Background section above.

The present invention is further described by way of the following examples. These examples are intended to be representative of the invention, and are not in any way intended to limit its scope.

EXAMPLE 1
The Influence of Melt Flow Rate of Linear Polycarbonate

The following additives were used in the examples given below:

pentaerythritol tetrastearate=PETS, CAS No: 115-83-3, trade name Loxiol EP8578, supplier Henkel (processing release agent);

tris(2,4-di-t-butylphenyl)-phosphite=CAS No: 31570-04-4, % phosphorus=4.8, trade name Irgaphos 168, supplier Ciba (Stabilizer);

2,4,6-tri-t-butylphenyl 2-butyl-2-ethyl-1,3-propane diol phosphite=CAS No: 161717-32-4, % phosphorus=6.9, trade name Ultranox 641, supplier GE Specialty Chemicals (Stabilizer).

Formulations #1–11, as listed in the table 1, were compounded in a twin screw extruder. The level of viscosity was controlled by using linear resins with various viscosities to match the target MVR. In all the formulations 1–11, the following additives were used:

0.05% Irgaphos 168
0.1% PETS

The materials were processed into sheet of 3.2 mm thickness, cut into sheets of 7 cm *7 cm and tested according to the French dripping test. Ten sheets of formulation were tested, the number of sheets which passed the testing ported in the Table 1.

TABLE 1

Linear resin formulations with various viscosities vs. flammability performance

| Formulation | MVR, (ISO 1133), 300 deg ° C., 1.2 kg, (cm3/10 min) | # pass | # sheets tested |
|---|---|---|---|
| 1 | 7.1 | 2 | 10 |
| 2 | 5.3 | 1 | 10 |
| 3 | 4.6 | 2 | 10 |
| 4 | 11.0 | 10 | 10 |
| 5 | 6.6 | 2 | 10 |
| 6 | 7.4 | 1 | 10 |
| 7 | 3.4 | 1 | 10 |
| 8 | 4.7 | 1 | 10 |
| 9 | 4.5 | 1 | 10 |
| 10 | 3.2 | 1 | 10 |
| 11 | 3.2 | 0 | 10 |

Statistical analyses for the attribute data of the number of passes vs. viscosity were carried out. The lower the p-value of each factor is, the more significant the factor is for the response (# pass in the FR test):

Binary Logistic Regression analyses on 3.2 mm solid sheet:
Response Information:

| Variable | Value | Count |
|---|---|---|
| pass | Success | 22 |
| n | Failure | 88 |
|  | Total | 110 |

Logistic Regression Table

| Predictor | Coef | StDev | Z | P | Odds Ratio | 95% CI Lower | 95% CI Upper |
|---|---|---|---|---|---|---|---|
| Constant | −0.8685 | 0.2943 | −2.95 | 0.003 |  |  |  |
| MVR, scaled | 2.3826 | 0.5303 | 4.49 | 0.000 | 10.83 | 3.83 | 30.63 |

Log-Likelihood = −40.174
Test that all slopes are zero: G = 29.741, DF = 1, P-Value = 0.000

Goodness-of-Fit Tests

| Method | Chi-Square | DF | P |
|---|---|---|---|
| Pearson | 8.163 | 8 | 0.418 |
| Deviance | 9.874 | 8 | 0.274 |
| Hosmer-Lemeshow | 6.693 | 4 | 0.153 |

Conclusion: Reduced viscosity (increased MVR) improves the flammability performance of linear polycarbonate sheet. At solid sheet thickness of 3.2 mm, the preferred MVR should be higher than 8 $cm^3/10$ min.

EXAMPLE 2
The Influence of Additives in Linear Polycarbonate

Formulations were compounded to study the influence of additives and additive loadings. Specifically, formulations #12–18, as listed below in the table 2, were compounded by the method described in Example 1. The MVR (300 deg ° C., 1.2 kg) of all the samples were 5.7–7.4 cm3/10 min. The materials were processed to sheet of 2.5 mm and tested according to the French dripping test. Ten sheets of each formulation were tested, the number of sheets which passed the testing are reported in the Table 2.

TABLE 2

Linear resin formulations in combination with a release agent vs. flammability performance

| Formulation | Irgaphos 168 % (%P) | PETS % | # passes | # sheets tested |
|---|---|---|---|---|
| 12 | 0.05 (0.002) | 0.1 | 6 | 10 |
| 13 | 0.05 (0.002) | 0.3 | 3 | 10 |
| 14 | 0.05 (0.002) | 0.1 | 7 | 10 |
| 15 | 0.1 (0.005) | 0.1 | 9 | 10 |
| 16 | 0.1 (0.005) | 0.3 | 4 | 10 |
| 17 | 0.2 (0.01) | 0.1 | 4 | 10 |
| 18 | 0.2 (0.01) | 0.3 | 3 | 10 |

Statistical analyses for the attribute data of the number of passes vs. viscosity were carried out. The lower the p-value of each factor is the more significant the factor is for the response (# pass in the FR test):

Binary Logistic Regression analyses on 2.5 mm solid sheet:
Response Information

| Variable | Value | Count |
|---|---|---|
| pass | Success | 36 |
| n | Failure | 34 |
|  | Total | 70 |

-continued

Logistic Regression Table

| Predictor | Coef | StDev | Z | P | Odds Ratio | 95% CI Lower | 95% CI Upper |
|---|---|---|---|---|---|---|---|
| Constant | 0.7647 | 0.5828 | 1.31 | 0.190 | | | |
| Irgaphos 168, scaled | −0.2199 | 0.3231 | −0.68 | 0.496 | 0.80 | 0.43 | 1.51 |
| PETS, scaled | −0.6523 | 0.2784 | −2.34 | 0.019 | 0.52 | 0.30 | 0.90 |
| Irg. 168, scal. *PETS, scal. | 0.2978 | 0.3222 | 0.92 | 0.355 | 1.35 | 0.72 | 2.53 |
| Irg. 168, scal. *Irg. 168, scal. | −1.1827 | 0.6874 | −1.72 | 0.085 | 0.31 | 0.08 | 1.18 |

Log-Likelihood = −42.506
Test that all slopes are zero: G = 11.972, DF = 4, P-Value = 0.018

Goodness-of-Fit Tests

| Method | Chi-Square | DF | P |
|---|---|---|---|
| Pearson | 1.182 | 1 | 0.277 |
| Deviance | 1.257 | 1 | 0.262 |
| Hosmer-Lemeshow | 1.182 | 4 | 0.881 |

Conclusion: Reducing the amount of the release agent, PETS, and optimizing the amount of heat stabilizer, Irgaphos 168, improves the flammability performance of polycarbonate sheet. At solid sheet thickness of 2.5 mm, the preferred phosphorus loading would be between 0.002–0.01%, ideally 0.005% (equal to 0.1% Irgaphos 168), and the loading of the processing release agent would be 0.1%.

EXAMPLE 3

Sheet Materials Made of Branched Polycarbonate, the Influence of Viscosity and Additives on Flame Performance Formulations #19–25, as listed in the table 3, were compounded by the process described in Example 1. Branched resin of MW 34 000-35 000 g/mol was blended with linear resin. The viscosity of the linear resin was varied to match the target MVR. The materials were processed to sheet of 3.2 mm, and tested according to the French dripping test. Ten sheets of each formulation were tested. The number of sheets which passed the test are reported in the table 3.

TABLE 3

Branched resin formulations with various viscosities and additives vs. flammability performance

| Formulation | MVR, (ISO1133), 300 deg ° C., 2.16 kg, (cm3/10 min) | % branched resin | PETS % | Ultranox 641, % (%P) | # passes | # sheets tested |
|---|---|---|---|---|---|---|
| 19 | 15.8 | 50 | 0.1 | 0.1 (0.007) | 5 | 10 |
| 20 | 9.3 | 72 | 0.25 | 0.04 (0.003) | 3 | 10 |
| 21 | 9.4 | 72 | 0.25 | 0.1 (0.007) | 1 | 10 |
| 22 | 8.9 | 72 | 0.1 | 0.1 (0.007) | 0 | 10 |
| 23 | 8.9 | 72 | 0.1 | 0.04 (0.003) | 1 | 10 |
| 24 | 9.1 | 72 | 0.25 | 0.04 (0.003) | 4 | 10 |
| 25 | 15.9 | 50 | 0.1 | 0.04 (0.003) | 6 | 10 |

Statistical analyses for the attribute data of the number of passes vs. viscosity were carried out. The lower the p-value of each factor is the more significant the factor is for the response (# pass in the FR test):

Binary Logistic Regression:

Response Information

| Variable | Value | Count |
|---|---|---|
| pass | Success | 20 |
| n | Failure | 50 |
| | Total | 70 |

Logistic Regression Table

| Predictor | Coef | StDev | Z | P | Odds Ratio | 95% CI Lower | 95% CI Upper |
|---|---|---|---|---|---|---|---|
| Constant | −0.5872 | 0.3176 | −1.85 | 0.064 | | | |
| MVR (scaled) | 1.6225 | 0.5665 | 2.86 | 0.004 | 5.07 | 1.67 | 15.38 |
| PETS (scaled) | 0.8061 | 0.5239 | 1.54 | 0.124 | 2.24 | 0.80 | 6.25 |
| Ultranox 641 (scaled) | −0.5209 | 0.3262 | −1.60 | 0.110 | 0.59 | 0.31 | 1.13 |

Log-Likelihood = −33.934
Test that all slopes are zero: G = 15.890, DF = 3, P-Value = 0.001

Goodness-of-Fit Tests

| Method | Chi-Square | DF | P |
|---|---|---|---|
| Pearson | 1.588 | 3 | 0.662 |
| Deviance | 1.864 | 3 | 0.601 |
| Hosmer-Lemeshow | 1.588 | 5 | 0.903 |

Conclusion Reduced viscosity (increased MVR), together with the level of heat stabilizer and PETS, have significant impact on flammability performance. The preferred composition for a solid sheet of 3.2 mm is 0.1% of PETS together with 0.04–0.1%, Ultranox 641 (=0.003–0.007% P). The MVR should be higher than 10, most preferably 15 cm3/10 min.

EXAMPLE 4

Comparison of the Improved Sheets vs. Commercial Sheet Materials

A typical commercial sheet of the formulation 27 was compared to a sheets 28 and 29 according to the invention, which had improved flammability performance at 3.2 mm thickness. The details of the formulations and the FR performance are listed in the table 4. The number of passes in the French dripping test was monitored.

TABLE 4

Comparison of a commercial sheet quality vs. an improved version for flammability

| Formulation | MVR, (ISO 1133), 300 deg ° C., 1.2 kg, (cm3/10 min) | % branched resin | Irgaphos 168, % | PETS, % | # pass | # sheets tested |
|---|---|---|---|---|---|---|
| 27 (reference) | 7.2 | 0 | 0.05 | 0.1 | 2 | 10 |
| 28 | 11.0 | 0 | 0.05 | 0.1 | 10 | 10 |
| 29 | 6.4 | 0 | 0.1 | 0.1 | 6 | 10 |

From the above sheet quality comparison it becomes clear that both the additives (#29) as well as viscosity (#28), have an influence on the flame performance. To maximize the improvement, both these parameters should be considered.

EXAMPLE 5
Sheet Materials Made of Branched Polycarbonate, the Influence of Viscosity and Additives on Flame Performance An additional experiment was performed to optimize the additive loadings and viscosity and to study possible interactions. Formulations #30–45, as listed below in table 5, were compounded by the process described in Example 1. The branched resin of MW 34,000–35,000 g/mol was blended with linear resin of MW of 21,400–22,200 g/mol. The materials were processed into 3.2 mm sheet, and tested according to the French dripping test. Ten plaques of each formulation were tested. The number of sheets which passed the test are reported in the table 5.

Statistical analyses for the attribute data of the number of passes vs. viscosity were carried out. The lower the p-value of each factor is the more significant the factor is for the response (# pass in the FR test):

| Binary Logistic Regression: Response Information | | |
|---|---|---|
| Variable | Value | Count |
| passes | Success | 38 |
| | Failure | 122 |
| n | Total | 160 |

TABLE 5

Branched resin formulations with various viscosities and additives vs. flammability performance

| Formulation | MVR, (ISO1133), 300 deg ° C., 2.16 kg (cm3/10 min) | % branched resin | PETS % | Ultranox 641, % (%P) | # passes | # sheets tested |
|---|---|---|---|---|---|---|
| 30 | 8.6 | 72 | 0.1 | 0.04 (0.003) | 1 | 10 |
| 31 | 8.5 | 72 | 0.25 | 0.04 (0.003) | 0 | 10 |
| 32 | 8.9 | 72 | 0.1 | 0.1 (0.007) | 0 | 10 |
| 33 | 8.4 | 72 | 0.25 | 0.1 (0.007) | 2 | 10 |
| 34 | 14.9 | 50 | 0.1 | 0.04 (0.003) | 1 | 10 |
| 35 | 15.2 | 50 | 0.25 | 0.04 (0.003) | 4 | 10 |
| 36 | 15.3 | 50 | 0.1 | 0.1 (0.007) | 6 | 10 |
| 37 | 15.5 | 50 | 0.25 | 0.1 (0.007) | 4 | 10 |
| 38 | 11.4 | 61 | 0.1 | 0.07 (0.005) | 2 | 10 |
| 39 | 11.7 | 61 | 0.25 | 0.07 (0.005) | 4 | 10 |
| 40 | 11.3 | 61 | 0.175 | 0.04 (0.003) | 2 | 10 |
| 41 | 12 | 61 | 0.175 | 0.1 (0.007) | 2 | 10 |
| 42 | 8.6 | 72 | 0.175 | 0.07 (0.005) | 1 | 10 |
| 43 | 15.3 | 50 | 0.175 | 0.07 (0.005) | 5 | 10 |
| 44 | 11 | 61 | 0.175 | 0.07 (0.005) | 2 | 10 |
| 45 | 11.4 | 61 | 0.175 | 0.07 (0.005) | 2 | 10 |

-continued

Logistic Regression Table:

| Predictor | Coef | StDev | Z | P | Odds Ratio | 95% CI Lower | 95% CI Upper |
|---|---|---|---|---|---|---|---|
| Constant | −0.9756 | 0.3038 | −3.21 | 0.001 | | | |
| Ultranox 641 (scaled) | 0.2333 | 0.2541 | 0.92 | 0.359 | 1.26 | 0.77 | 2.08 |
| PETS (scaled) | 0.3510 | 0.2649 | 1.33 | 0.185 | 1.42 | 0.85 | 2.39 |
| MVR (scaled) | 1.0646 | 0.2907 | 3.66 | 0.000 | 2.90 | 1.64 | 5.13 |
| Ultranox 641* Ultranox 641 (scaled) | −0.5243 | 0.4154 | −1.26 | 0.207 | 0.59 | 0.26 | 1.34 |

Log-Likelihood = −78.225
Test that all slopes are zero: G = 18.967, DF = 4, P-Value = 0.001

| Goodness-of-Fit Tests | | | |
|---|---|---|---|
| Method | Chi-Square | DF | P |
| Pearson | 7.874 | 11 | 0.725 |
| Deviance | 9.193 | 11 | 0.604 |
| Hosmer-Lemeshow | 2.816 | 6 | 0.832 |

Conclusion: Again, strong influence of viscosity and heat stabilizer is seen. With the further optimization of the heat stabilizer loading and viscosity, the amount of PETS plays slightly less significant role. The preferred formulation contains 0.1% PETS, 0.1% Ultranox 641 and has MVR of at least 15. From the experiments it can clearly be seen that not only the increase in MVR (e.g. formula. 30 vs. 34), but also optimization of the processing release agent and heat stabilizer content is important to further improve the FR performance (formulations 30, 34, 35 and 36).

EXAMPLE 6

Processability in Plant Scale

To produce commercial scale sheets, especially multiwall structures, higher melt strength (high viscosity and high branching level) is typically preferred. To test whether it is possible to produce good quality sheet with polycarbonate having low viscosity and melt strength, the following formulations were tested in commercial scale sheet line to produce 16 mm three wall sheet.

1. Reference formulation (a commercial LEXAN® sheet grade):
   Linear polycarbonate with MVR of 4.8 cm3/10 min (300 deg ° C., 1.2 kg)
2. Formulation with low melt strength:
   Linear polycarbonate with MVR of 9.3 cm3/10 min (300 deg ° C., 1.2 kg)

No production issues were observed for the low viscosity formulation. Smooth change over from the standard grade to the low viscosity grade was easily accomplished. However, the temperatures of the extruder barrels was reduced approximately 20 deg ° C. to get the same quality sheet as under standard processing conditions and with the standard materials. Processability, calibration behavior and standard material properties remained the same.

It should be remembered that the above examples merely show representative compositions according to the invention and should not be read as limiting the scope of the following claims in any way.

We claim:

1. A fire resistant polycarbonate sheet comprising:
   a) branched polycarbonate resin having an MVR above 11 cm$^3$/10 minutes, wherein MVR is measured at 300° C. and 2.16 kg,
   b) a phosphorous-based stabilizer, and
   c) a processing release agent.
2. The fire resistant polycarbonate sheet according to claim 1, wherein the polycarbonate resin has an MVR above 13 cm$^3$/10 minutes.
3. The fire resistant polycarbonate sheet according to claim 2, wherein the polycarbonate resin has an MVR below 20 cm$^3$/10 minutes.
4. The fire resistant polycarbonate sheet according to claim 3, wherein the polycarbonate resin has an MVR below 18 cm$^3$/10 minutes.
5. The fire resistant polycarbonate sheet according to claim 3, wherein the sheet comprises from 0.003 to 0.007 weight percent, based on the weight of the phosphorous, of the phosphorous-based stabilizer.
6. The fire resistant polycarbonate sheet according to claim 5, wherein the sheet comprises-from 0.05 to 0.2 weight percent of the processing release agent.
7. The fire resistant polycarbonate sheet according to claim 1, wherein the stabilizer is selected from the group consisting of tris(2,4-di-t-butylphenyl)-phosphite; 2,4,6-tri-t-butylphenyl 2-butyl-2-ethyl-1,3-propane diol phosphite; bis(2,4-dicumylphenyl)pentaerytritol diphosphite; diphenyl isodecyl phosphite; and bis(2,4-ditertiarybutylphenyl) pentaerythritol diphosphite.
8. The fire resistant polycarbonate sheet according to claim 1, wherein the processing release agent is selected from the group consisting of pentaerythritol tetrastearate and pentaerythritol esters.
9. The fire resistant polycarbonate sheet according to claim 1, wherein said sheet passes French flammability test NF P 92-505.
10. The fire resistant polycarbonate sheet according to claim 1, wherein said sheet is solid sheet having a thickness of 1 to 12 mm.
11. The fire resistant polycarbonate sheet according to claim 10, wherein said solid sheet has a thickness of 1 to 6 mm.
12. The fire resistant polycarbonate sheet according to claim 1, wherein said sheet is layered sheet having a thickness of 1 to 40 mm.
13. The fire resistant polycarbonate sheet according to claim 12, wherein said sheet is layered sheet having a thickness of 1 to 20 mm.
14. A fire resistant polycarbonate sheet comprising:
   a) linear polycarbonate resin having an MVR above 8 cm$^3$/10 minutes, wherein MVR is measured at 300° C. and 1.2 Kg,
   b) a phosphorous-based stabilizer, and
   c) a processing release agent.
15. The fire resistant polycarbonate sheet according to claim 14, wherein the polycarbonate resin has an MVR above 10 cm$^3$/10 minutes.
16. The fire resistant polycarbonate sheet according to claim 15, wherein the polycarbonate resin has an MVR below 20 cm$^3$/10 minutes.
17. The fire resistant polycarbonate sheet according to claim 16, wherein the polycarbonate resin has an MVR below 13 cm$^3$/10 minutes.
18. The fire resistant polycarbonate sheet according to claim 15, wherein the sheet comprises from 0.002 to 0.01 weight percent, based on the weight of the phosphorous, of the phosphorous-based stabilizer.

19. The fire resistant polycarbonate sheet according to claim 18, wherein the sheet comprises from 0.05 to 0.2 weight percent of the processing release agent.

20. The fire resistant polycarbonate sheet according to claim 18, wherein the stabilizer is selected from the group consisting of tris(2,4-di-t-butylphenyl)-phosphite; 2,4,6-tri-t-butylphenyl 2-butyl-2-ethyl-1,3-propane diol phosphite; bis(2,4-dicumylphenyl)pentaerytritol diphosphite; diphenyl isodecyl phosphite; and bis(2,4-ditertiarybutylphenyl) pentaerythritol diphosphite.

21. The fire resistant polycarbonate sheet according to claim 18, wherein the processing release agent is selected from the group consisting of pentaerythritol tetrastearate and pentaerythritol esters.

22. The fire resistant polycarbonate sheet according to claim 14, wherein said sheet passes French flammability test NF P 92-505.

23. The fire resistant polycarbonate sheet according to claim 14, wherein said sheet is solid sheet having a thickness of 1 to 12 mm.

24. The fire resistant polycarbonate sheet according to claim 23, wherein said solid sheet has a thickness of 1 to 6 mm.

25. The fire resistant polycarbonate sheet according to claim 14, wherein said sheet is layered sheet having a thickness of 1 to 40 mm.

26. The fire resistant polycarbonate sheet according to claim 25, wherein said sheet is layered sheet having a thickness of 1 to 20 mm.

27. A fire resistant polycarbonate sheet comprising:
  a) linear polycarbonate resin having an MVR above 8 and below 20 cm$^3$/10 minutes, wherein the MVR is measured at 300° C. and 1.2 kg,
  b) from 0.002 to 0.01 weight percent, based on the weight of the phosphorous, of a phosphorous-based stabilizer, and
  c) a processing release agent.

28. The fire resistant polycarbonate sheet according to claim 27, wherein the polycarbonate resin has an MVR below 16 cm$^3$/10 minutes.

29. The fire resistant polycarbonate sheet according to claim 27, wherein the polycarbonate resin has an MVR below 16 cm$^3$/10 minutes.

30. A fire resistant polycarbonate sheet comprising:
  a) a blend of a linear polycarbonate resin and a branched polycarbonate resin, wherein the blend has an MVR above 10 cm$^3$/10 minutes measured at 300° C. and 2.16 kg,
  b) a phosphorus-based stabilizer, and
  c) a processing release agent.

31. The fire resistant polycarbonate sheet according to claim 30, wherein the blend has an MVR above 15 cm$^3$/10 minutes.

32. The fire resistant polycarbonate sheet according to claim 30, wherein the sheet comprises from 0.003 to 0.007 weight percent, based on the weight of the phosphorus, of the phosphorus-based stabilizer.

33. The fire resistant polycarbonate sheet according to claim 30, wherein the sheet comprises from 0.05 to 0.2 weight percent of the processing release agent.

34. The fire resistant polycarbonate sheet according to claim 30, wherein the stabilizer is selected from the group consisting of tris(2,4-di-t-butylphenyl)-phosphite; 2,4,6-tri-t-butylphenyl 2-butyl-2-ethyl-1,3-propane diol phosphite; bis(2,4-dicumylphenyl)pentaerytritol diphosphite; diphenyl isodecyl phosphite; and bis(2,4-ditertiarybutylphenyl) pentaerythritol diphosphite.

35. The fire resistant polycarbonate sheet according to claim 30, wherein the processing release agent is selected from the group consisting of pentaerythritol tetrastearate and pentaerythritol esters.

36. The fire resistant polycarbonate sheet according to claim 30, wherein said sheet passes French flammability test NF P 92-505.

37. The fire resistant polycarbonate sheet according to claim 30, wherein said sheet is a solid sheet having a thickness of 1 to 12 mm.

38. The fire resistant polycarbonate sheet according to claim 30, wherein said sheet is a solid sheet having a thickness of 1 to 6 mm.

39. The fire resistant polycarbonate sheet according to claim 30, wherein said sheet is a layered sheet having a thickness of 1 to 40 mm.

40. The fire resistant polycarbonate sheet according to claim 30, wherein said sheet is a layered sheet having a thickness of 1 to 20 mm.

* * * * *